Aug. 1, 1967     D. B. CRAWFORD, SR., ET AL     3,333,872
MECHANICAL PIPE JOINT CONSTRUCTION
Filed Nov. 18, 1964     2 Sheets-Sheet 1
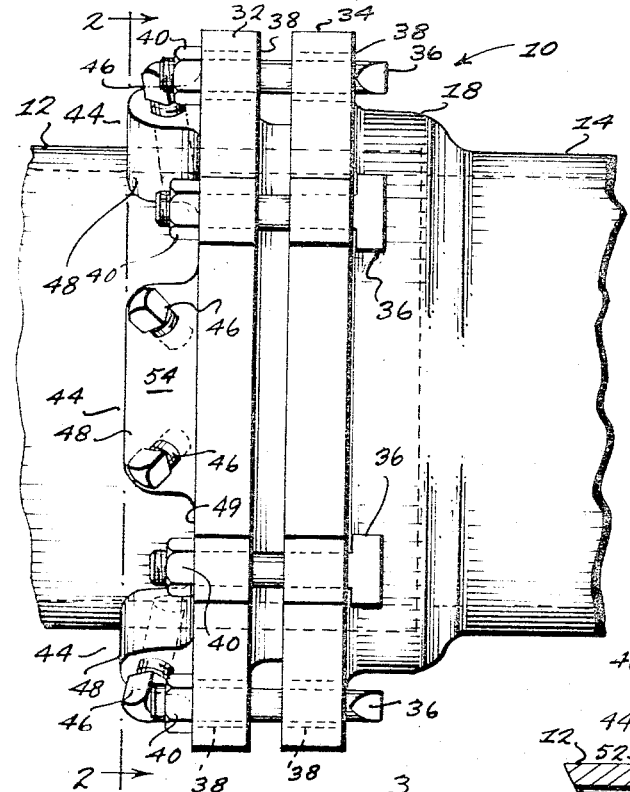
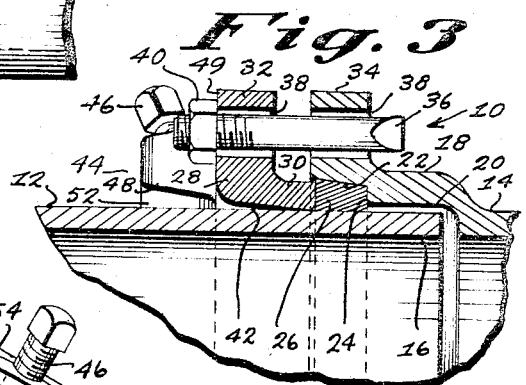
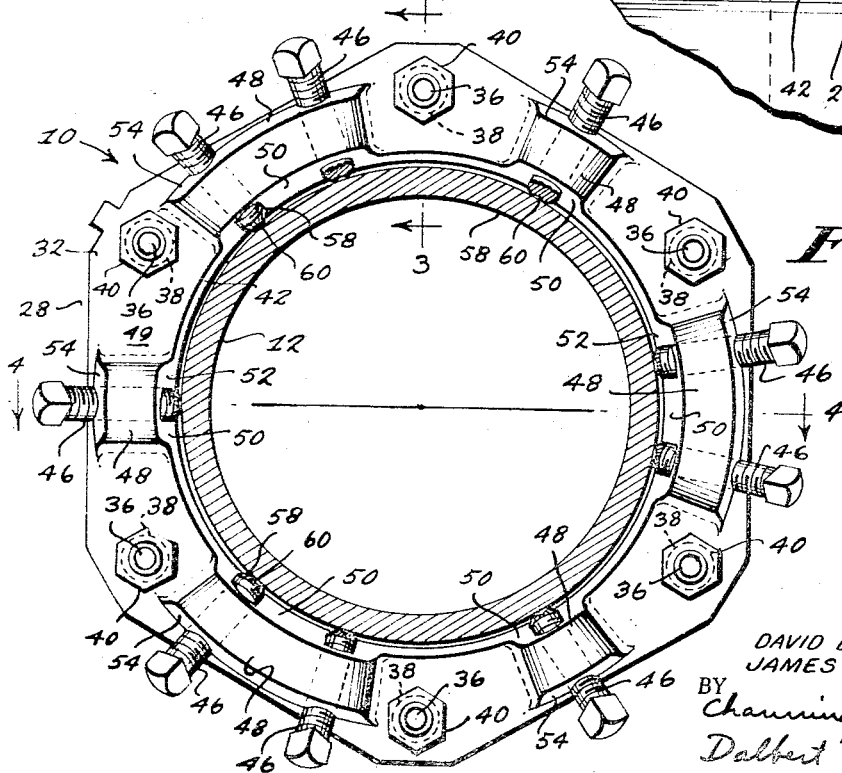
INVENTORS
DAVID B. CRAWFORD, Sr.
JAMES W. LOFTIN
BY Channing L. Richards &
Dalbert U. Shefte
ATTORNEYS Aug. 1, 1967  D. B. CRAWFORD, SR., ETAL  3,333,872
MECHANICAL PIPE JOINT CONSTRUCTION
Filed Nov. 18, 1964  2 Sheets-Sheet 2

INVENTORS
DAVID B. CRAWFORD, Sr.
JAMES W. LOFTIN
BY
Channing L. Richards
Delbert H. Shefte
ATTORNEYS

United States Patent Office 3,333,872
Patented Aug. 1, 1967

3,333,872
MECHANICAL PIPE JOINT CONSTRUCTION
David B. Crawford, Sr., and James W. Loftin, Charlotte, N.C., assignors to Standard Fire Protection Equipment Co., Charlotte, N.C., a corporation of North Carolina
Filed Nov. 18, 1964, Ser. No. 412,200
8 Claims. (Cl. 285—374)

The present invention relates to a new and improved mechanical pipe joint construction having greatly enhanced holding power to maintain the joint intact under substantial operating pressures within the pipe. This enhanced holding power is obtained by a uniquely arranged supplementary attaching means that not only provides an unexpected degree of holding power, but in doing so does not complicate the ease and simplicity of installation of the joint nor significantly increase the cost of manufacture of the joint.

A mechanical pipe joint is one in which the ends of two pipe components are joined by seating the straight or spigot end of one pipe component, surrounding which is an annular sealing gasket, in the bell or socket end of the other pipe component and compressing the gasket in sealing and gripping disposition between the pipe components by attaching an annular retainer gland to the socket end of the other pipe in abutment with the sealing gasket. In this type of joint the compressed gasket not only seals the joint but also grips the pipe components to retain them against separation.

Such mechanical pipe joints provide tight joints while allowing considerable deflection, and are simple and inexpensive to install. As a result, they are used extensively in gas and water systems. However, as the pipe components are held together only by the gripping of the compressed annular gasket, the joint is susceptible to failure when subjected to high operating pressures that could force the pipe components apart against the friction grip of the gasket. For example, in water main systems that are adapted for emergency service as part of a fire prevention system, the pressure within the system during fire prevention service may be several times the normal pressure such that failure of the joint becomes a possibility at a time when failure could be disastrous.

Increased holding power is provided to a small extent in some prior mechanical pipe joints through the use of set screws extending radially from the retainer gland into clamping engagement with the pipe component that has the spigot or straight end, but these radial set screws have been found to increase the holding power only slightly.

In the present invention, a mechanical pipe joint is provided that results in a strikingly unexpected increase in holding power many times greater than the increase obtained with radial set screws, such that a mechanical pipe joint can be made according to the present invention to meet required high standards which have not been met by prior mechanical pipe joints even with radial set screws.

By the present invention, supplementary attaching means, preferably in the form of a plurality of set screws, is provided extending inwardly from the retainer gland into clamping engagement with the pipe component that has the spigot or straight end, and at a slight inclination from a radial direction toward the other pipe component. This slight inclination presents the supplementary attaching means in clamping engagement with the pipe component in a binding disposition that resists separation in a longitudinal direction because of the inclination and the penetration resulting therefrom as compared with the frictional engagement with radial set screws. Some enhanced holding power would be expected with such an inclination. However, not only does the construction of the present invention produce a holding power beyond that obviously to be expected, but to obtain this exceptional holding power the inclination must be limited to only a slight inclination as the striking advantage is unexpectedly lost when the inclination is increased.

Thus, in incorporating the present invention in a mechanical pipe joint construction of the type wherein the retainer gland is formed of relatively ductile iron and has a relieved inner surface to permit deflection of the surrounded pipe component, and the supplementary attaching means is a plurality of set screws of high-hardness steel that span the space between the relieved inner surface of the retainer gland and the surrounded pipe component, an inclination in the order of approximately 10° from a radial direction will provide more than half again the holding power of a conventional mechanical pipe joint and significantly more holding power than with either radial or substantially inclined set screws, such that the mechanical pipe joint of the present invention is capable of meeting desired pressure standards with a minimum of set screws whereas other mechanical pipe joints, even with radial or substantially inclined set screws of a comparable number, are not. Actually, the holding power of the joint of the present invention is stronger than the holding power of the pipe itself such that in most instances the pipe will fail before failure of the joint occurs.

The above features and advantages are contained in the preferred embodiment of the present invention, which is described in detail below and illustrated in the accompanying drawings, in which:

FIG. 1 is an elevational view of the preferred embodiment of the mechanical pipe joint of the present invention;

FIG. 2 is a vertical sectional view taken along line 2—2 of FIG. 1;

FIG. 3 is a fragmentary vertical sectional view taken along line 3—3 of FIG. 2.

Figure 4:
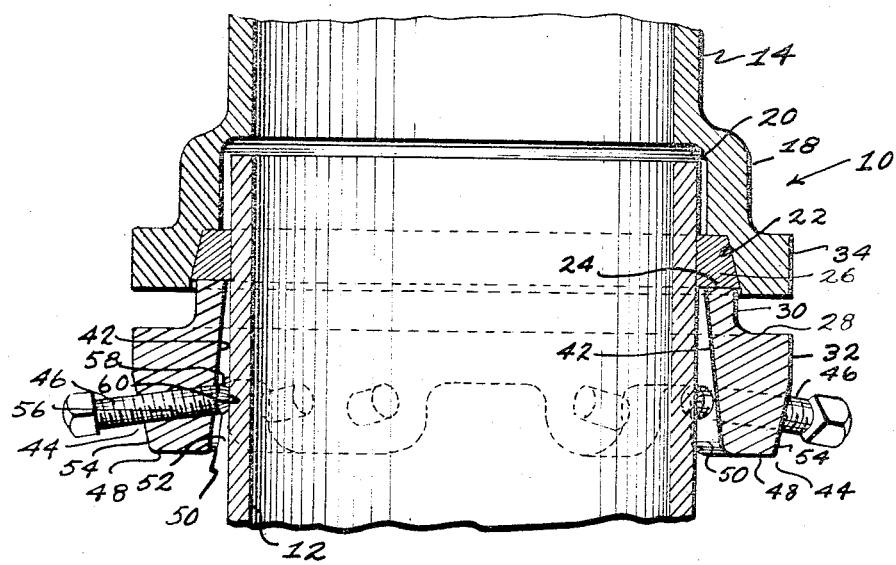
FIG. 4 is a horizontal sectional view taken along line 4—4 of FIG. 2.

The mechanical pipe joint 10 of the illustrated preferred embodiment of the present invention connects two pipe components 12 and 14 in a sealed joint. One pipe component 12 has a plain or spigot end 16 and the other pipe component 14 has a socket or bell end 18 interiorly recessed, as at 20, to receive the spigot end 16 of the first pipe component 12, which recess 20 is larger than the spigot end 16 of the first pipe component 12 to perm't slight relative deflection of the pipe components at the joint. The socket end 18 of the second pipe component 14 is further enlarged outwardly at its end to form an outwardly tapering recess 22 from an interior shoulder 24.

The spigot end 16 of the first pipe component 12 is retained in the socket end 18 of the second pipe component 14 by means of an annular gasket 26 of rubber or other resilient material. This gasket 26 fits tightly around the first pipe component 12 adjacent the spigot end 16 thereof and seats in the enlarged recess 22 of the socket end 18 of the second pipe component 14 against the shoulder 24 thereof. The gasket 26 is frusto-conical in cross-section to conform to the tapered shape of the recess 22.

The gasket 26 is compressed in the recess 22 between the pipe components 12 and 14 to provide a seal and to grip the pipe components for retention thereof by an annular retaining gland 28 that surrounds the first pipe component 12 and has an annular shoulder 30 extending into abutment with the gasket 26. The gland 28 has an exterior annular attaching flange 32 facing a similar flange 34 formed at the end of the second pipe component 14.

Means are provided for attaching the flanges 32 and 34 together, which, in the embodiment illustrated, is in the form of T-head bolts 36 extending through aligned bolt holes 38 in the flanges 32 and 34 with nuts 40 tightenable on the bolts 36 to draw the retainer gland 28 toward the socket end 18 of the second pipe component 14 and thereby force the shoulder 30 of the retainer gland 28 against the annular gasket 26 to compress the gasket 26 in the enlarged recess 22 in sealing and gripping disposition.

The inner annular surface 42 of the retainer gland 28 extends away from the gasket 26 at an outwardly inclined relief angle to permit slight deflection of the first pipe component 12 with respect to the retainer gland 28 and second pipe component 14.

The construction described in detail up to this point is conventional for mechanical pipe joints, and it is in a construction of this type that supplementary attaching means 44 are incorporated to provide the mechanical pipe joint 10 of the present invention. This supplementary attaching means 44 in the illustrated preferred embodiment includes a plurality of circumferentially spaced set screws 46 threadably supported in mounting blocks 48 formed on the back face 49 of the retainer gland 28. These set screws 46 extend inwardly from the mounting blocks 48 into clamping engagement with the first pipe component 12 at a slight inclination from a radial direction toward the second pipe component 14. The inner surfaces 50 of the mounting blocks 48 form continuations of the relieved inner surface 42 of the retainer gland 28 to permit the aforementioned relative deflection of the pipe components 12 and 14, with the relief resulting in spacings 52 between the mounting blocks 48 and the first pipe component 12, which spacings are spanned by the set screws 46 and in which spacings 52 the set screws are unsupported.

The exterior surfaces 54 of the mounting blocks 48 are formed at a taper such that the surfaces 54 are normal to the axis of the set screws 46 to facilitate machining of the threaded bores 56 in which the set screws 46 are mounted.

To facilitate the clamping engagement of the set screws 46 in the surface of the first pipe component 12, the inner ends 58 of the set screws 46 converge conically to concave tips 60 with the ends 58 being knurled outwardly of the concave tips 60 such that the set screws 46 penetrate the surface of the pipe component 12 to resist longitudinal separation of the pipe components 12 and 14. With the set screws 46 inclined as described, any force tending to separate the pipe components 12 and 14 would be resisted by the angular penetration of the set screws 46.

Figure 5:
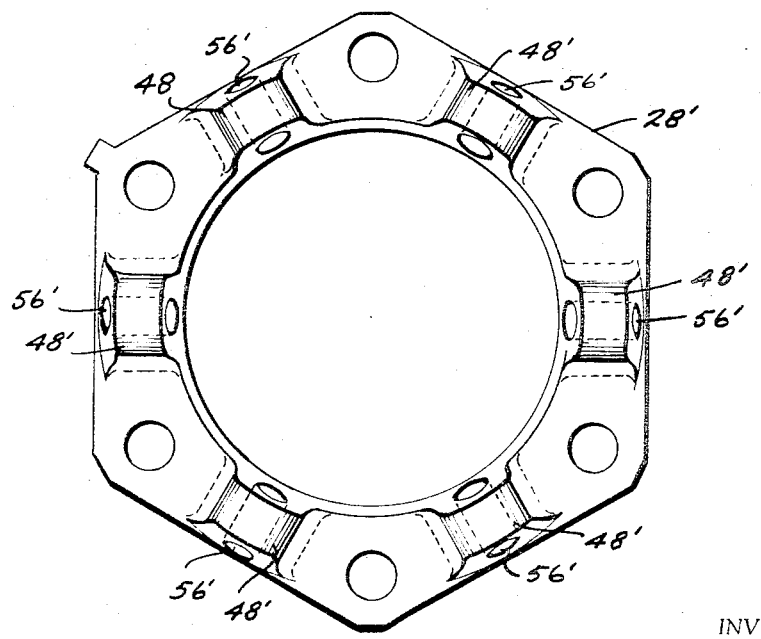
FIG. 5 is a front elevational view of a slightly modified retainer gland construction.

In the embodiment illustrated in FIGS. 1–4, the mechanical pipe joint 10 is of a hexagonal design, having six attaching bolts 36 and six mounting blocks 48, with alternate mounting blocks being enlarged to mount two set screws 46, such that there are nine set screws in the complete joint. The number of set screw mountings may be varied to meet various standards. For example, FIG. 5 shows a smaller size retainer gland 28' having six mounting blocks 48' with a total of only six set screw bores 56' which is adequate for a small diameter system.

The gland 28 is preferably formed of a relatively ductile iron such that it can withstand the stresses of attachment without failure, and the set screws 46 are preferably formed of a heat-treated alloy steel having a relatively high-hardness, as for example, a hardness of Rockwell C43. In the preferred embodiment the set screws 46 are disposed at an inclination of ten degrees away from a radial direction, and the inner surface 42 of the retainer gland 28 and the inner surfaces 50 of the mounting blocks 48 are relieved at an angle of seven degrees from the cylindrical surface of the first pipe component 12.

This mechanical pipe joint construction, when incorporated in an eight-inch pipe system, was found to withstand a water pressure in the system of 1,000 pounds per square inch without any sign of failure and even without any distortion that would hinder a disassembly of the joint components. In comparison, a conventional mechanical pipe joint without the inclined set screws of the present invention will fail to withstand satisfactorily a water pressure of only about 600 pounds per square inch, and radial set screws increase the holding power only a small percentage.

Contrary to expectations, the inclination of the set screws 46 must be restricted to only a slight inclination in the order of ten degrees in the preferred embodiment. For example, a set screw inclination of fifteen degrees from a radial direction was found not to be capable of withstanding a water pressure of 1,000 pounds per square inch without unsatisfactory results.

The mechanical pipe joint 10 of the present invention is inexpensively and simply manufactured, requiring only a slightly more involved casting of the retainer gland to provide the mounting 48, and requiring tapping of the mounting block bores 56. Otherwise, the manufacture is identical to prior conventional mechanical pipe joints.

Similarly, the mechanical pipe joint 10 of the present invention is easily assembled in the same manner as conventional joints simply by first sliding the retainer gland 28 on the spigot end 16 of the first pipe component 12, mounting the gasket 26 also on the spigot end 16 of the first pipe component 12, inserting the spigot end 16 of the first pipe component in the socket end 18 of the second pipe component 14, attaching the retainer gland 28 to the socket end 18 of the second pipe component 14 by the T-head bolts 36, which causes the retainer gland shoulder 30 to compress the gasket 26 in sealing and gripping disposition, and finally tightening the set screws 46 into clamping engagement with the first pipe component 12.

The number of set screws and the inclination thereof may be varied to suit different system conditions and different materials of construction, so long as the set screws are disposed at a comparatively slight inclination to obtain the enhanced holding power as compared with either a radial or a substantially inclined disposition. Thus, the present invention has been described in detail above for purposes of illustration only and is not intended to be limited by this description or otherwise except as defined in the appended claims.

I claim:

1. A mechanical pipe joint of the type used in main lines of fire prevention systems, said mechanical pipe joint comprising a first pipe component having a socket end, a second pipe component having a spigot end disposed within said socket end of the first pipe component, an annular sealing gasket surrounding the said second pipe component at the spigot end thereof and within the socket end of said first pipe component, an annular retainer gland surrounding said second pipe component in abutment with said sealing gasket, means attaching said retainer gland to the socket end of said first pipe component in gasket compressing disposition, and supplementary attaching means extending inwardly from said retainer gland into clamping engagement with said second pipe component at an inclination of substantially 10° from a radial direction toward said first pipe component.

2. A mechanical pipe joint according to claim 1 and characterized further in that said supplementary attaching means comprises a plurality of circumferentially spaced set screws threaded in said retainer gland and clampingly engaging said second pipe component at said inclination.

3. A mechanical pipe joint according to claim 2 and characterized further in that said annular retainer gland is formed of ductile iron and said set screws are formed of high-hardness steel.

4. A mechanical pipe joint according to claim 3 and characterized further in that said set screws have concave tips in engagement with said second pipe component.

5. A mechanical pipe joint of the type used in main lines of fire prevention systems, said mechanical pipe joint comprising a first pipe component having a socket end, a second pipe component having a spigot end disposed within said socket end of the first pipe component, an annular sealing gasket surrounding said second pipe component at the spigot end thereof and within the socket end of said first pipe component, an annular retainer gland surrounding said second pipe component in abutment with said sealing gasket and having a relieved inner surface extending away from said gasket abutment to provide a spacing between said retainer gland and said second pipe component at said relieved inner surface, means attaching said retainer gland to the socket end of said first pipe component in gasket compressing disposition, and supplementary attaching means extending inwardly from said retainer gland across said spacing at said relieved inner surface into clamping engagement with said second pipe component at an inclination of substantially 10° from a radial direction toward said first pipe component.

6. A mechanical pipe joint according to claim 5 and characterized further in that said supplementary attaching means comprises a plurality of circumferentially spaced set screws threaded in said retainer gland and extending across said spacing into clamping engagement with said second pipe component at said inclination.

7. A mechanical pipe joint according to claim 6 and characterized further in that said annular retainer gland is formed of ductile iron and said set screws are formed of high-hardness steel.

8. A mechanical pipe joint according to claim 7 and characterized further in that said set screws having concave tips in engagement with said second pipe component.

References Cited

UNITED STATES PATENTS

| | | | |
|---|---|---|---|
| 350,421 | 10/1886 | Dresser | 285—348 |
| 618,587 | 1/1899 | Simmons | 285—356 |
| 884,749 | 4/1908 | Mason | 285—356 |
| 1,126,386 | 1/1915 | Butts | 285—374 |
| 1,494,693 | 5/1924 | Loi | 285—404 |
| 2,272,222 | 2/1942 | Mullen | 285—348 |
| 618,587 | 1/1899 | Simmons | 285—356 |
| 3,134,615 | 5/1964 | Cator | 285—341 |

CARL W. TOMLIN, *Primary Examiner.*

D. W. AROLA, *Assistant Examiner.*

UNITED STATES PATENT OFFICE
CERTIFICATE OF CORRECTION

Patent No. 3,333,872                         August 1, 1967

David B. Crawford, Sr., et al.

It is hereby certified that error appears in the above numbered patent requiring correction and that the said Letters Patent should read as corrected below.

Column 6, line 21, for "618,587     1/1899     Simmons---- 285-356" read -- 2,832,615    4/1958    Summers------285-374 --.

Signed and sealed this 14th day of November 1967.

(SEAL)
Attest:

Edward M. Fletcher, Jr.
Attesting Officer

EDWARD J. BRENNER
Commissioner of Patents